3,114,627
PRODUCING METALLIC MAGNESIUM FROM A MAGNESIUM OXIDE CONTAINING MATERIAL

Kozo Aoyama, Tokyo, Japan, assignor to Asahi Kasei Kogyo Kabushiki Kaisha, Osaka, Japan, a corporation of Japan
No Drawing. Filed May 24, 1960, Ser. No. 31,273
Claims priority, application Japan Dec. 16, 1959
5 Claims. (Cl. 75—67)

This invention relates to a method of producing metallic magnesium from a magnesium oxide containing material by thermal reduction. There are various reports and literatures in connection with laboratory or industrial scale plant production of metallic magnesium by adding ferrosilicon to a magnesium oxide-containing material and heating the mixture under reduced pressure thereby to effect reduction of the material. Pidgeon's and Bagley's processes (reaction temperature 1150°–1250° C.) are typical for large-scale production. The former process is an outer-heating, smaller volume and shorter-cycle system while the latter process is an inner-heating, larger-volume and longer-cycle system. Pidgeon process is more familiar because of the fact that it can use as heat-source a cheap fuel such as natural gas or heavy oil, and the apparatus is simpler and can be more safely operated, than in the Bagley process, although the heat efficiency is inferior to the latter's process. Pidgeon's process, however, suffers, among other drawbacks, from the fact that a heat-proof retort made of special steel causing high wear and tear expense, must be used and that the capacity per retort is extremely low. Recently, the Beaudean process has been developed by Pechiney in France. This process has greater capacity per retort than that of Pidgeon, and is a shorter-cycle system. When magnesium oxide-containing material of dolomite is reduced with ferrosilicon, slag of $2CaO \cdot SiO_2$ is formed, the melting point of which is 2130° C. This process comprises the addition of alumina to the system of calcined dolomite and ferrosilicon in order to reduce the melting point of the slag. The residue or slag thus obtained consists of silicoaluminate of lime, melting at about 1500° C. In Beaudean process, reaction temperature is 1500°–1600° C. and the reactants are in the form of fluid throughout the reaction, so that capacity per retort is improved. The residue has good electro-conductivity, and consequently heat sufficient to maintain the thermal reduction reaction may be supplied by directly charging with electric current thereto. Unreacted ferrosilicon in the form of fluid is readily separable from the slag due to gravity difference. However, the fact that the ore in Beaudean process is restricted to dolomite yields unavoidably a slag having a mole ratio of $CaO/SiO_2$ of not less than 2. In order to provide a slag having lower melting point and electro-conductivity, alumina must be added until the $Al_2O_3/SiO_2$ mole ratio in slag is not less than 0.3. According to a pamphlet issued by Pechiney Company, alumina is required in an amount of 750 kg. per metallic magnesium, so that the mole ratio of $Al_2O_3/SiO_2$ in slag will be about 0.6. It is considered that the reaction follows the chemical equation:

$$2(CaO \cdot MgO) + (Fe)Si + 0.6\ Al_2O_3 \rightarrow SiO_2 \cdot 0.6Al_2O_3 \cdot 2CaO + 2Mg \quad (1)$$

It will be seen from the above equation that a large amount of slag-forming materials such as lime and alumina must be added to magnesium oxide and ferrosilicon. 1 mole of lime and 0.3 mole of alumina are required in excess for producing 1 mole of metallic magnesium. Calcined materials of 6–7 tons must be charged to produce 1 ton of metallic magnesium, and accordingly electric power consumption in operation inevitably increases.

The present invention is an improvement of Beaudean process. I have discovered a method for the efficient and economic production of metallic magnesium without requiring such excess in amounts of slag-forming materials as the Beaudean process.

An object of the present invention is to provide a method of producing metallic magnesium from magnesium oxide-containing materials wherein an amount of the oxide materials required to produce a unit weight of the metal is greatly reduced compared with that required by Beaudean, thereby resulting in a reduction of the production costs.

Another object of the present invention is to produce metallic magnesium without adding alumina which is one of slag forming materials in Beaudean. The other object of the present invention is to produce metallic magnesium from magnesia in sea water.

I have never found that a slag having 44–64% by weight of $SiO_2$, 30–53% by weight of CaO and 3–14% by weight of MgO, melts at a temperature less than 1450° C. and has better electroconductivity when fused, than that of Beaudean. Intrinsic electric resistances at various temperatures of the slag having the above mentioned composition are given in the table below.

TABLE 1

| Temperature (° C.) | $\Omega/cm.^3$ | |
|---|---|---|
| | Beaudean | The present |
| 1,310 | | 6.5 |
| 1,340 | | 5.3 |
| 1,350 | | 4.6 |
| 1,400 | 800 | |
| 1,500 | 50 | |
| 1,600 | 4 | |

The present process according to my invention is carried out in conformity with the following chemical equation:

$$2MgO + (Fe)Si + mCaO + nMgO \rightarrow SiO_2 \cdot mCaO \cdot nMgO + 2Mg \quad (2)$$

$SiO_2$, $m$CaO and $n$MgO form the slag. From the above equation, it will readily be seen that the slag-forming material such as lime and magnesia are employed as little as possible and, furthermore, no expensive alumina is required.

A magnesiumoxide containing material suitable in the present invention is magnesia produced from sea water. Such magnesia is readily available so that the present process does not depend upon the use of dolomite ore. As seen from the above Equation 2, the mole ratio of CaO to MgO in the charge feed, i.e., $m:(2+n)$, according to Equation 2 above, must be about 0.26–0.56, for this reason, dolomite is rather undesirable, because it is mainly composed of $CaO \cdot MgO$, corresponding to a molar ratio of 1:1. The less the amount of CaO in the MgO-containing material is, the better. However, if dolomite is used, magnesia obtained from sea water is admixed so that CaO to MgO becomes 0.26–0.56. Ferrosilicon and lime which are slag-forming materials are common ones, and any of the commercially available materials may be used.

The present process is carried out in a graphite crucible at a temperature of 1500°–1600° C. The pressure in the reaction zone is preferably 0.1–5.0 mm. Hg. The heating up of the charge as well as the maintenance of the reaction temperature is conducted by directly passing an electric current through the charge or molten slag. On the basis of the above Equation 2, 0.5 mole of CaO and 0.079 mole of MgO are theoretically required as slag forming materials per mole of produced metallic magnesium to form a slag having 49% SiO$_2$, 45.8% CaO and 5.2% MgO. In practice the amount of residual, unreacted MgO enough to supply the necessary amount of 0.079 mole of MgO. It will be seen from a comparison of the above equations of the above Equations of (1) and (2), that 0.5 mole, i.e. half of the CaO and 0.3 mole of the Al$_2$O$_3$ required in the Beaudean process (1) are not required for carrying out the present process (2) according to my invention. The theoretical amounts of charge required per ton of ferrosilicon is used. That is, the amount of charge in the present process is about 55% of that of Beaudean. Accordingly, the cost of production in the present process is considerably reduced. This is the most favorable feature of the present process. When magnesium oxide containing materials of dolomite are used as MgO component in Equation 2, magnesium oxide produced from sea water is added thereto, and then the necessary amount of CaO is added in accordance with Equation 2.

The purity of the metallic magnesium produced by the present process is about 99.9%, and Fe as impurity is contained therein in amounts up to about 0.002%.

For the purpose of giving those skilled in the art a better understanding of the invention, the following illustrative examples are given:

*Example 1*

In accordance with the Equations 1 and 2, respectively, pulverized magnesia (grade: 95.1%), pulverized ferrosilicon (grade: 76.7%), lime (grade: 98.2%) and alumina (grade: 99.9%) were mixed together and briquetted. The mixing was conducted assuming that the reaction efficiency between magnesia and ferrosilicon was 80%. In case of (2), no addition of MgO to that fed to initiate the reaction is required once the reaction starts, because MgO left in the slag is enough to maintain the reaction. When $m$ is 1 and $n$ is 0.158 in Equation 2, the composition of slag thus produced will be SiO$_2$ 49%, CaO 45.8% and MgO 5.2%.

The briquettes were charged into graphite crucibles respectively, and heated for 60 min. at a reduced pressure of 0.5–3 mm. Hg. For initial 30 minutes the briquettes were heated at 1500° C., and during the following 30 minutes at 1600° C. Both briquettes were completely fused at 1500–1540° C. Metallic magnesium was obtained in a condensation cylinder mounted on the graphite crucible. The results were shown in Table 2 below.

TABLE 2

| | Charge | | | | | Mg obtained | Charge/ Mg. obtained | MgO reaction efficiency, percent |
|---|---|---|---|---|---|---|---|---|
| | MgO | Fe-Si | CaO | Al$_2$O$_3$ | Total | | | |
| Beaudean process | 106 | 45.8 | 114.2 | 61.8 | 327.8 | 55.2 | 5.94 | 91.3 |
| The present | 106 | 45.8 | 57.1 | | 208.9 | 55.0 | 3.80 | 90.5 |

From the above table, it will be seen that materials of charge per produced metallic magnesium in the present process are considerably less than Beaudean process, that is, 64% of the latter. Amounts of charges of magnesia and ferrosilicon in both processes are substantially same. The present process requires no alumina and only half the amount of lime of the Beaudean process. The amounts of magnesium produced are substantially the same.

What I claim is:

1. A process for manufacturing metallic magnesium by adding ferrosilicon to a magnesium oxide-containing material and heating under reduced pressure to effect reduction, which comprises preparing a mixture which is substantially free from aluminum, consisting essentially of a magnesium oxide-containing material, ferrosilicon and lime wherein, in which mixture the molar ratio of magnesium oxide to silicon is approximately 2:1 and that of calcium oxide to magnesium oxide is about 0.26 to 0.56, heating up to 1450°–1500° C. and then raising the temperature to 1600° C. to effect liquid phase reduction, while maintaining a pressure of about 0.1 to 5.0 mm. Hg., thereby forming magnesium vapor and a molten slag consisting of 44 to 64% by weight of SiO$_2$, 30 to 53% by weight of CaO and 3 to 14% by weight of MgO, cooling the magnesium vapor to recover metallic magnesium and separating ferrosilicon in the molten phase by gravity difference from the molten slag thereby recovering the ferrosilicon.

2. A process according to claim 1 wherein magnesia recovered from sea water is mixed with dolomite in such amounts that the aforesaid ratio of CaO to MgO equal to about 0.26 to 0.56 is obtained.

3. In a process for manufacturing metallic magnesium by thermal reduction of calcium oxide and magnesium oxide-containing materials and ferrosilicon, and condensing vapor of magnesium produced from the reduction and recovering metallic magnesium, the improvement which comprises preparing a mixture consisting essentially of calcium oxide, magnesium oxide and ferrosilicon, in which the mole ratio of CaO:MgO ranges from about 0.26 to 0.56 and which is substantially free from aluminum, and heating the mixture to fusion at a temperature of 1500 to 1600° C. at reduced pressure, the amount of silicon in the ferrosilicon being sufficient to produce a molten slag consisting essentially of 44–64% of SiO$_2$, 30–53% of CaO and 3–14% of MgO and having a melting point below 1450° C., and metallic magnesium vapor.

4. The improvement according to claim 3, in which the magnesium oxide-containing material is magnesia obtained from sea water.

5. The improvement according to claim 3, in which dolomite is admixed with magnesia obtained from sea water in such proportions that the aforesaid molar ratio of CaO:MgO in the resulting mixture of about 0.26 to 0.56 is obtained.

References Cited in the file of this patent

UNITED STATES PATENTS 2,934,423    Bretschneider et al.    Apr. 26, 1960
2,971,833    Artru et al.    Feb. 14, 1961

FOREIGN PATENTS 727,038    Great Britain    Mar. 30, 1955